Patented Dec. 1, 1953

2,661,372

UNITED STATES PATENT OFFICE 2,661,372

PHARMACOLOGICALLY VALUABLE STEREO-
ISOMERS OF CERTAIN AMINO ALCOHOLS
AND THEIR SALTS

Clemens Schöpf and Karl Jakob Kunz, Darmstadt, Germany, assignors to Troponwerke Dinklage & Co., Koln-Mulheim, Germany, a German corporation No Drawing. Application April 7, 1949,
Serial No. 86,122

9 Claims. (Cl. 260—570.6)

This invention relates to new and useful improvements in pharmacologically valuable stereoisomers of certain amino alcohols and their salts.

1 - (p - hydroxyphenyl) - 2 - (alpha - methyl - gamma - phenyl - propylamino) - propanol - (1) and salts thereof constitute therapeutically and pharmacologically valuable products. These products, however, are produced in the form of their stereoisomeric racemates, i. e., mixtures of stereoisomers. As will be seen from the following constituent formula of the base

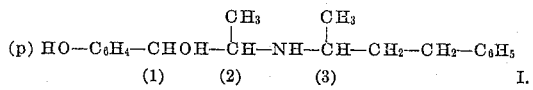

there are three carbon atoms forming centers of asymmetry as shown by the numerals (1), (2) and (3). These three asymmetric carbon atoms could form 4 stereoisomeric racemates.

The aforementioned propanol and its salts are, for example, produced by a condensation reaction of a suitable 1 - (p-hydroxy - phenyl) - 2 amino-propanol-(1) or their corresponding propanon (including esters and ethers of these products) with a suitable methyl-phenyl-ethyl ketone or corresponding halide or alcohol and subsequent hydrogenation of the condensation product. Alternatively, these products are prepared by condensation of a suitable methyl-alpha-amino-gamma-phenyl propane with a suitable 1 - (p. - hydroxy - phenyl - 1 - keto [or hydroxy]-2-keto [hydroxy or halogen]-propane (including the esters and ethers thereof) and the hydrogenation of the condensate. By using a sterically unitary hydroxy phenyl propane compound (or esters or ethers thereof) the condensate obtained and thus the therefrom resulting base or salt of the above generic constituent Formula I will have the same steric configuration for the asymmetric carbon atoms (1) and (2) and the product of the reaction will then be principally composed of two stereoisomeric racemates differing with respect to the steric configuration relative to the asymmetric carbon atom (3).

We have discovered that it is possible to separate the racemates (differing in the steric configuration of asymmetric carbon atom (3)), and that the isolated racemates and their salts individually possess considerably enhanced therapeutical and pharmacological properties over those of their mixture of racemates. Furthermore, the mixture of racemates possesses properties which does not render the same generally suitable for medical use whereas the separated isomers individually produced in relatively pure form are free from this objection.

One object of the invention comprises among others sterically unitary isomers or their salts represented by the above general constituent Formula I, the isomerism being dependent upon the there indicated asymmetric carbon atom (3).

Another object of the invention comprises the preparation of the sterically unitary isomers in accordance with the invention by separation of their racemate mixtures.

The foregoing and still further objects of the invention will appear from the following description.

The mixture of stereoisomeric propanol racemates may be separated in accordance with the invention into a first substantially unitary stereoisomer propanol of the above generic Formula I having in the form of its free base a melting point of substantially 111–112° C., and into a second substantially unitary stereoisomer of such propanol having in the form of its free base a melting point of about 139–140° C. For the sake of convenience, said first stereoisomer (M. P. 111–112° C.) will be hereinafter referred to as the "base" of the herein mentioned propanol, and the second such stereoisomer (M. P. 139–140° C.) as the "isobase" of said propanol.

Because of the great chemical similarity of the stereoisomers to be separated, the separation of the mixtures forms a comparatively difficult task. Whereas stereoisomers of amino compounds can be readily separated as a rule by crystallization of their salts with mineral acids, such as the hydrogen halides, it is not possible to effect a separation of the herein referred to amino propanol racemates by fractional crystallization of the hydrochlorides or hydrobromides.

In accordance with the invention, a 1-(p-hydroxy - phenyl) - 2 - (alpha - methyl - gamma - phenyl - propylamino) - propanol - (1) of melting point 111–112° C. (base) and its stereoisomer of melting point 139–140° C. (isobase) can be separated surprisingly easily from mixtures thereof by fractional crystallization if either the free bases or the bases liberated from their salts are crystallized from lower alcohols, preferably methanol, or if the salts of the racemates with fatty acids containing 2-4 carbon atoms are crystallized preferably from dilute aqueous solutions of the same fatty acids.

In one form of the process, in which the free bases are crystallized from a mixture thereof, the bases are subjected to fractional crystallization from methanol, in which case the base of melting point 111–112° C. crystallizes out first. The mother liquor is then further worked up in a manner depending upon the content of the isobase. If the mother liquor is supersaturated with respect to its base, then the isobase of melting point 139–140° C., which is subject to delayed crystallization, may be crystallized out by prolonged standing in the cold. If the mother liquor is not supersaturated with this base, then it is advisable to first concentrate the solution. Alternatively, the isobase remaining in the mother liquor (of the base) may be converted into a salt by addition of mineral acids, for example hydrochloric acid, and to isolate this salt by crystallization in the usual way, and to purify it by recrystallization or by way of the free base.

If the mixture is in the form of a salt, for example the hydrochloride, then separation may be advantageously effected by suspension of the salt in methanol, adding an equi-molecular quantity of methanolic alkali, for example sodium methylate or methanolic caustic soda or preferably methanolic caustic potash, filtering off the base which crystallized out together with the potassium salt of the acid (i. e., potassium chloride when a hydrochloride mixture is used) and recovering the isobase from the mother liquor in the above described manner. The base is separated from its inorganic salt content by washing with water and is obtained in substantially pure form by recrystallization from methanol or by the conversion into a salt. The isobase or the hydrochloride thereof is likewise obtained substantially pure by recrystallization from suitable solvents.

If the isobase is present in the mixture to be separated in particularly large quantity, i. e., more than about 60%, then the main quantity of the isobase, after dissolving in methanol, is separated as a hydrochloride by addition of hydrochloric acid as described above for the methanol mother liquor of the base. If the mixture of the bases is in the form of a hydrochloride, then the hydrochloride of the base can be dissolved out by heating with a little aqueous methanol or water, whereupon an equal quantity of isobase is also dissolved. The undissolved hydrochloride of the isobase remaining behind is purified by recrystallization or by way of the free base; the mixture taken up into solution is separated in the above described manner.

In the above described process, ethanol can also be used as solvent, but about twice as much ethanol as methanol must be used for the separation.

In accordance with a further embodiment of the process of the invention, the racemic mixtures of the mineral acid salts of the herein referred to amino alcohols or their free bases are first converted into their fatty acid salts with aliphatic acids containing 2–4 carbon atoms. Salts of acetic acid, propionic acid or butyric acid may be thus produced. These are well crystallized and permit smooth separation of the stereoisomers by fractional crystallization. Preferably diluted aqueous solutions of the same fatty acids are used as solvents. Other solvents, for example methanol may also be used, however.

The above described processes, especially the process of separation by means of the free bases, are particularly easy to carry out and give the isomers directly in a very high degree of purity.

The following examples are furnished by way of illustration but not of limitation:

Example I 20 grams of a mixture containing about equal parts of the base and isobase were dissolved in 20 ccs. of hot methanol and, after cooling, the solution was inoculated with crystals of the base. After standing for about three hours at room temperature, 9.2 grams of the base of melting point 108–111° C. crystallized out. This was dried at 70° C. when 1 mol of methanol of crystallization was given off, yielding 92% of the amount of the base originally present in the mixture. The mother liquor, after concentrating and standing, was filtered, yielding a further relatively small quantity of the crystallized base. The mother liquor filtrate was inoculated with crystals of the isobase and after standing for about twelve hours at room temperature, the isobase of melting point 138–139° C. crystallized out and was filtered off in a yield of 5.1 grams (i. e., about 51% of the quantity originally present). A further quantity of isobase is obtained in the form of the hydrochloride by acidification of its mother liquor with concentrated hydrochloric acid.

By way of alternative procedure, mother liquor from the base (obtained as above set forth) is acidified with concentrated hydrochloric acid to the Congo acid point (exemplified by blue coloration of Congo-red indicator paper or solution) and is filtered to obtain the hydrochloride of the isobase, having a melting point of about 218–221° C. which crystallized out after standing for about two hours. The yield of isobase is about 8.4 grams (i. e., 76% of the quantity originally present). The hydrochloride is brought to a constant melting point of about 223–224° C. by recrystallization from water. The free isobase precipitated from aqueous solutions of the chloride, as for example with ammonia, melts at about 139–140° C.

The mother liquors from isobase material obtained in any of the foregoing separations may be suitably worked up in the form of their HCl acidified (Congo end point) solutions by substantially evaporating the solvent in vacuo and triturating the residual hydrochloride mixture with acetone. This mixture may then be included in a fresh separation process. In this way, an almost quantitative separation can be effected.

Example II 42 grams of the mixture of the hydrochlorides of the base and isobase obtained for example by hydrogenation of 1-(p-hydroxyphenyl)-2-aminopropanol-(1) in the presence of benzyl acetone, acidification with hydrochloric acid, evaporation and heating with acetone (as, for instance, described in the co-pending application of one of us, Schöpf and Kunz, Serial Number 86,123, filed April 7, 1949), were heated under reflux for a short time with 75 ccs. of 1.7 N methanolic caustic potash. After cooling, the solution was inoculated with crystals of the base. After standing for about four hours at room temperature, the crystallizate was filtered off, washed with 15 ccs. of methanol, triturated with water to remove the potassium chloride which separated out in the crystallizate, filtered, washed with water and dried at 70° C. 14.6 grams (i. e., 39% of the original mixture) of the base of melting point 109–111° C. were obtained and the melting point rose to the constant value of 111–112° C. after a single recrystallization from methanol.

The methanol mother liquor was then concentrated as described in Example I to separate the isobase.

By way of alternative procedure, the methanol mother liquor (obtained as herein stated), was acidified with concentrated hydrochloric acid and the hydrochloride of the isobase, which crystallized out after about two hours, was filtered off. 14.8 grams (i. e., 35% of the original mixture) of the hydrochloride of the isobase having a crude melting point of about 218–221° C. were obtained. The melting point rose to the constant value 223–224° C. after recrystallization from water.

The last mother liquor was evaporated in vacuo, the dried residue was heated with acetone and the hydrochloride mixture obtained (7.2 grams equals 17% of the mixture) melting at 208–210° C. was included in a fresh separating process.

Example III 20 grams of the mixture of the hydrochlorides of the base and isobase, obtained as described in Example II, were heated with 21 ccs. of 2.9 N methanolic caustic potash and the solution, after cooling, was inoculated with crystals of the base. Further working up was effected as described in Example II. Working at this higher concentration, 7.9 grams (i. e., 44% of the original mixture) of the base (melting point 108–111° C.) and a residue of 2.15 grams (11% of the original mixture) of unseparated hydrochloride mixture were obtained. The three fractions were worked up to the pure compounds as described in Example II.

Example IV 4 parts by weight of a hydrochloride racemate consisting of 75% (by weight) of the hydrochloride of the isobase and 25% (by weight) of the hydrochloride of the base, were heated under reflux with 25 parts by weight of 85% methanol. After standing for several hours at room temperature, the mixture was filtered. 82% (by weight) of the original quantity of the hydrochloride of the isobase were obtained having a crude melting point 222–223° C., which indicates practically pure form. The mother liquor was concentrated in vacuo and the residue, consisting of a mixture of hydrochlorides, was separated as described in Example II.

Example V 1 part by weight of a hydrochloride racemate consisting of 85% (by weight) of the hydrochloride of the isobase and 15% (by weight) of the hydrochloride of the base, was heated on a boiling water bath for a quarter of an hour with two parts by weight of water. The solution was filtered off hot from undissolved material and the latter was washed with 0.5 part by weight of hot water. 90% (by weight) of the original quantity of the hydrochloride of the isobase of melting point 222–223° C. remained behind as a residue in practically pure form. When the mother liquor was evaporated, a mixture of hydrochlorides was obtained as a residue, which was separated as described in Example II.

Example VI 20 grams of a racemate of approximately equal parts of the base and isobase were separated as described in Example I, but 45 ccs. of ethanol were used instead of 20 ccs. of methanol. The yield of the base and of the hydrochloride of the isobase were practically the same as in Example I, where 45 ccs. of methanol were used. The melting points were only slightly lower.

Example VII 23 grams of the hydrochloride of a mixture of the base and isobase which could not be separated by crystallization, were dissolved in warm water, precipitated with potassium carbonate and shaken out with chloroform to form the free bases which remained behind after evaporation of the chloroform. The residue was dissolved by heating in a little acetic acid, the solution was concentrated in vacuo and the crystallized residue was triturated with ether (or benzene), filtered, washed and dried. 19.4 grams of crude acetate of melting point 181–185° C. were obtained. By fractional crystallization of this acetate mixture from N/10 acetic acid, preferably by the triangular method, 7 grams of a pure sterically unitary acetate of melting point 195–199° C. and 6.4 grams of the acetate of a stereoisomer of 184–189° C. were obtained, i. e., 70% in all of the original acetate mixture. The residue was recovered by evaporating the mother liquors and was preferably included in a new separation process. It was also possible to effect the separation by fractional crystallization from water or from somewhat concentrated, preferably up to 2N acetic acid, and also, though somewhat less smoothly, from methanol.

From the acetate of melting point 195–199° C., i. e., the acetate which is more sparingly soluble and more readily crystallizable, a crystallized base was obtained by addition of potassium carbonate which melted at 139–140° C. (isobase) after recrystallization from methanol. From the acetate melting at 184–189° C., a base melting at 110–111° C. (base) was obtained in analogous manner. The hydrochlorides of both bases have each a M. P. of about 223–224° C. They gave a melting point depression when mixed with one another.

Efforts to separate these hydrochlorides or the corresponding hydrobromides by conventional crystallization were not successful.

Example VIII

A mixture of the two stereoisomeric propionates, having a crude melting point of 170–173° C. was separated by fractional crystallization from N/10 propionic acid solution in a manner analogous to that described in Example VII for the acetates. A unitary propionate of constant melting point 186–188° C. was obtained. This is the more sparingly soluble and more readily recrystallizable of the two propionates, and is derived from the isobase of melting point 139–140° C. The thereto stereoisomeric propionate is obtained with a constant melting point of about 175–177° C., which corresponds to the base melting at 110–111° C.

Example IX

A mixture of stereoisomeric butyrates, having a crude melting point of 155–157° C. obtained in a manner analogous to the acetate mixture of Example VII, was similarly separated by fractional crystallization from N/10 butyric acid or methanol. A more sparingly soluble and more readily crystallizable butyrate corresponding to the isobase of melting point 139–140° C. and a more readily soluble butyrate derived from the base melting at 110–111° C. were obtained. The first mentioned butyrate had a constant melting point of about 178–180° C., while the other butyrate had a constant melting point of about 168–169° C.

We claim:

1. An aralkylamino propane product being essentially a member of the group consisting of the acid addition salts and free base of the stereo isomeric racemate for which the melting point of its free base is substantially 111–112° C. and which is represented by the general formula for said base (p) HO—C₆H₄—CHOH—CH—NH—CH—CH₂—CH₂—C₆H₅
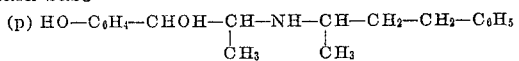

2. The product according to claim 1 in which said racemate is said free base.
3. The product according to claim 1 in which said racemate is the hydrochloride.
4. The product according to claim 1 in which said racemate is the hydrobromide.
5. The product according to claim 1 in which said racemate is the hydroiodide.
6. Method for the separation of a stereo isomeric racemate of an aralkylamino propane product represented by the general formula for its base (p) HO—C₆H₄—CHOH—CH—NH—CH—CH₂—CH₂—C₆H₅
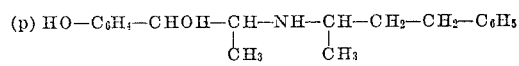

from a mixture of two such racemates having for their individual free bases melting points of substantially 111–112° C. and substantially 139–140° C. respectively which comprises subjecting a solution of said mixture in an alkanol of not more than 3 carbon atoms to crystallization to thereby obtain a crystallizate substantially containing the racemate of said first mentioned racemate base and separating said crystallizate from its mother liquor.

7. Method according to claim 6 in which said alcohol does not have in excess of 2 carbon atoms.

8. Method for the separation of a stereo isomeric racemate of an aralkylamino propane product represented by the general formula for its base (p) HO—C₆H₄—CHOH—CH—NH—CH—CH₂—CH₂—C₆H₅
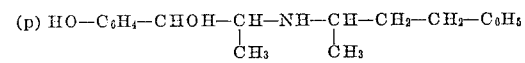

from a mixture of two such racemates having for their individual free bases melting points of substantially 111–112° C. and substantially 139–140° C. respectively which comprises treating such a mixture in the form of the hydrochlorides of its components with one equivalent of alkali in the presence of an alkanol having not in excess of 2 carbon atoms to thereby obtain an alkanol solution of a mixture of the free bases of said racemates, subjecting said solution to crystallization to thereby obtain a crystallizate substantially containing the racemate of said first mentioned racemate base, separating said crystallizate from its mother liquor, and washing said crystallizate with water to substantially remove inorganic salt content therefrom.

9. Method for the separation of a stereo isomeric racemate of an aralkylamino propane product represented by the general formula for its base (p) HO—C₆H₄—CHOH—CH—NH—CH—CH₂—CH₂—C₆H₅
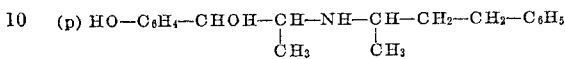

from a mixture of two such racemates having for their individual free bases melting points of substantially 111–112° C. and substantially 139–140° C. respectively which comprises substantially boiling a mixture of the hydrochlorides of said racemates and predominately containing the racemate the free base of which possesses the higher melting point, with a solvent selected from the group consisting of water and aqueous alkanol containing not in excess of 2 carbon atoms to thereby dissolve in said solvent a mixture of about equal portions of the hydrochlorides of both of said racemates leaving the excess hydrochloride of the isomer for which the base has the higher melting point substantially undissolved, treating the solution of racemate mixture with one equivalent of alkali in the presence of an alkanol having not in excess of two carbon atoms to thereby obtain an alkanol solution of a mixture of the free bases of said racemates, subjecting said solution to crystallization to thereby obtain a crystallizate substantially containing the racemate of said first mentioned racemate base, separating said crystallizate from its mother liquor, and washing said crystallizate with water to substantially remove inorganic salt content therefrom.

CLEMENS SCHÖPF.
KARL JAKOB KUNZ.

References Cited in the file of this patent

UNITED STATES PATENTS

| Number | Name | Date |
|---|---|---|
| 2,061,136 | Bockmuhl et al. | Nov. 17, 1936 |
| 2,214,034 | Tabern | Sept. 10, 1940 |
| 2,243,977 | Peyer | June 3, 1941 |

OTHER REFERENCES

Gilman, "Organic Chemistry," Wiley and Sons, Inc., New York, N. Y., 1938, vol. 1, pp. 187 to 189.

Gilman, "Organic Chemistry," Wiley and Sons, Inc., New York, N. Y., 1938, vol. 1, pp. 164–165.

Fieser et al., "Organic Chemistry," Heath and Co., Boston, Mass., 1944, page 276.